United States Patent [19]

Kang

[11] 4,195,557

[45] Apr. 1, 1980

[54] CUTTING, SCORING AND EMBOSSING DIE SET

[75] Inventor: Pierson S. Kang, Lansdale, Pa.

[73] Assignee: Chem Par Corporation, Montgomeryville, Pa.

[21] Appl. No.: 920,518

[22] Filed: Jun. 29, 1978

Related U.S. Application Data

[62] Division of Ser. No. 803,336, Jun. 3, 1977, Pat. No. 4,112,827.

[51] Int. Cl.² ............................................. B31B 1/20
[52] U.S. Cl. ............................................. 93/59 R
[58] Field of Search ............... 93/58.3, 59 R; 101/28

[56] References Cited

U.S. PATENT DOCUMENTS

| | | | |
|---|---|---|---|
| 1,831,434 | 11/1931 | Adams | 101/28 |
| 1,871,492 | 8/1932 | Brennecke | 156/228 X |
| 3,170,342 | 2/1965 | Downie | 76/107 |
| 3,847,036 | 11/1974 | Miller | 76/107 C |
| 3,863,550 | 2/1975 | Sarka et al. | 93/58.3 |
| 3,884,132 | 5/1975 | Snodgrass | 93/59 MT |

FOREIGN PATENT DOCUMENTS

| | | | |
|---|---|---|---|
| 1060111 | 2/1967 | United Kingdom | 93/58.3 |
| 1060313 | 3/1967 | United Kingdom | 93/58.3 |
| 1173601 | 12/1969 | United Kingdom | 76/107 C |

Primary Examiner—Robert D. Baldwin
Attorney, Agent, or Firm—Seidel, Gonda, Goldhammer & Panitch

[57] ABSTRACT

A die set for cutting, scoring and embossing sheet material comprises a first die having cutting rules, scoring rules and embossing means attached to a base, a mating die cooperating with the first die having mating embossing means for cooperating with the first embossing means on the first die and registering means on the first die and the mating die for ensuring proper registration of the first embossing means and the mating embossing means.

5 Claims, 2 Drawing Figures

CUTTING, SCORING AND EMBOSSING DIE SET

This application is a division of my co-pending application Ser. No. 803,336, now U.S. Pat. No. 4,112,827 for "Method Of Making Cutting, Scoring And Embossing Die Set" issued Sept. 12, 1978.

BACKGROUND OF THE INVENTION

The present invention relates to improvements in steel rule die sets of the type used in cutting out, scoring and embossing box blanks from sheets of paper, plastic or the like.

The present invention is an improvement over the invention disclosed and claimed in U.S. Pat. No. 3,863,550 of Sarka and Kang, of which the present applicant is a co-inventor. The invention of that patent overcame disadvantages enumerated therein of prior art cutting and scoring dies.

A problem still exists where it is desired to cut out, score and emboss a plurality of box blanks. It is very difficult and tedious to align the embossing means to produce an embossment properly positioned with respect to printing or other ornamentation on the box blanks. It has been necessary to carefully measure, place and secure the male and female embossing elements in exact alignment on the male and female die members. Where a plurality of cutting, scoring and embossing dies are located on a single die support for simultaneously cutting, scoring and embossing a plurality of relatively small blanks, the time required to align the male and female embossing members is substantial. Moreover, inaccuracies are possible because of the large number of adjustments which are necessary.

British Pat. Nos. 1,060,111 and 1,060,313, both issued to American Can Company, disclose the use of a male embossing element with a cutting and scoring die set. The male embossing element does not mate with a rigid female embossing element. Rather, the male embossing element operates in conjunction with a resilient insert attached to the die plate or the press.

It is well known that in order to obtain a sharply defined embossment a rigid male embossing member must cooperate with a rigid female embossing member. To ensure this cooperation, exact alignment of the rigid embossing members is necessary.

SUMMARY OF THE INVENTION

The present invention overcomes the problems of the prior art by providing a simple, accurate means for aligning male and female embossing means attached to cutting and scoring dies or which are integrally formed as a part of the cutting and scoring dies.

The present invention comprises a cutting, scoring and embossing die set comprising a first die having a base which includes cutting means, scoring means and first embossing means (which may be either a female or male embossing element), a mating die having a base including means for cooperating with the cutting means and the scoring means of the first die, mating embossing means (a female embossing element if the first embossing means is a male element, or vice versa) for cooperating with the first embossing means, and registering means associated with the first die and the mating die for ensuring proper registration of the first embossing means and the mating embossing means.

As used in this specification and claims, the word "emboss" and all of its derivatives includes both embossing and debossing processes. A sheet is embossed when portions thereof are raised in relief from the surrounding surface. A sheet is debossed when portions thereof are depressed below the surrounding surface. Thus, an embossment may become a debossment merely by changing the relationship of the male embossing member and the female embossing member or by inverting the sheet.

The drawings forming a part of this specification, and the description thereof illustrate a die for use in a flat press. This is merely for purposes of illustration. The present invention encompasses the use of cutting, scoring and embossing dies on platen presses, rotary presses or on any other suitable presses.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE PREFERRED EMBODIMENTS

Figure 1:
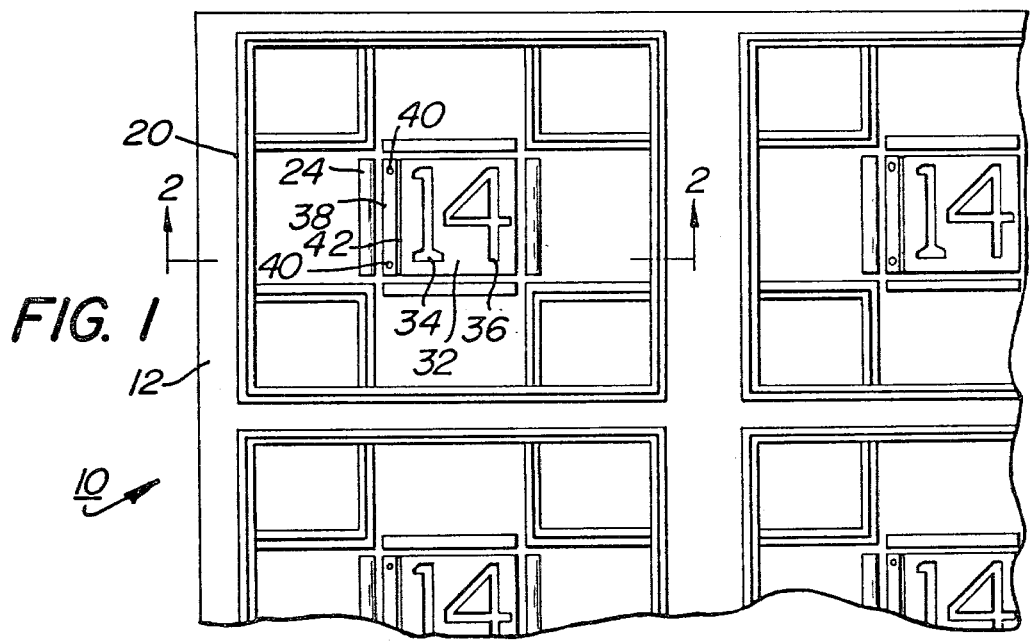
FIG. 1 is a partial bottom plan view of a die showing a plurality of repetitive cutting, scoring and embossing means in accordance with the present invention.

Referring to the drawings in detail, wherein like numerals indicate like elements, there is shown in FIG. 1 a die 10 comprising a plurality of cutting, scoring and embossing means to cut, score and emboss a sheet, forming a plurality of embossed box blanks. The sheet may be made of coated or uncoated paper products, plastic material, metal or any other type of sheet material which may be formed into scored and embossed blanks, for example, cigarette box blanks.

Although a plurality of substantially identical repetitive cutting, scoring and embossing means are illustrated as being attached to the die base or support 12 in FIG. 1, only one will be described in detail for purposes of illustration.

Figure 2:
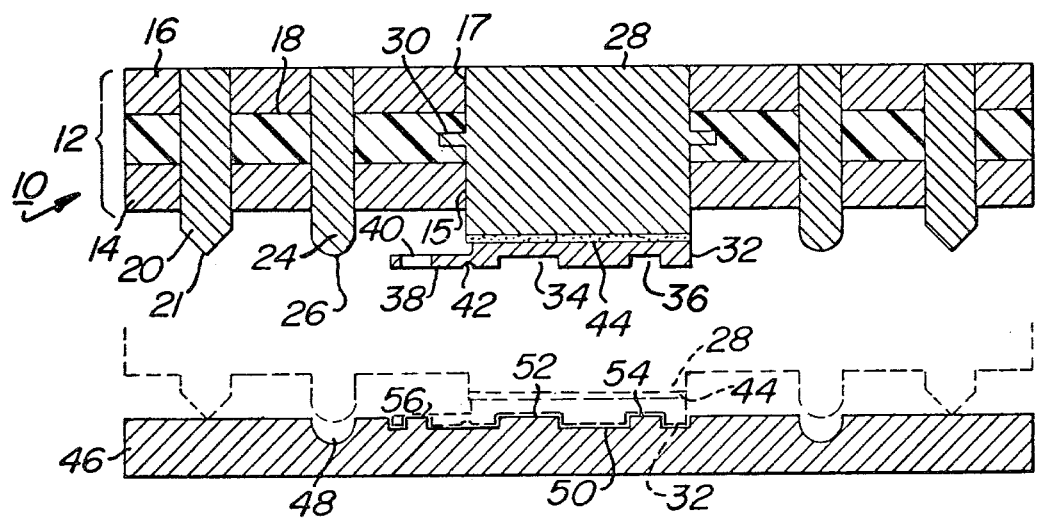
FIG. 2 is a partial sectional view of a cutting, scoring and embossing die set in accordance with the present invention, the sectional view of the upper die being taken along line 2—2 of FIG. 1.

With reference to FIGS. 1 and 2, a die support or base 12 comprises any suitable substantially dimensionally stable plates 14 and 16 separated by an intermediate semi-rigid plastic material 18 therebetween. The base 12 can be any solid material such as metal or plastic.

Cutting rules 20 and scoring rules 24 are inserted in slots in base or support 12 and affixed thereto by means of the semi-rigid plastic material 18 or other suitable means. Cutting rules 20 have a pointed edge 22 for cutting the sheet material. Scoring rules 24 have a blunt or rounded edge 26 for scoring the sheet material.

Die 10 is shown as the upper die in FIG. 2. It is not necessary that die 10 be the upper die. Thus, die 10 can be the fixed die or the movable die, the upper die or the lower die in the die set.

The attachment of cutting rules 20 and scoring rules 24 to base or support 12 and the construction of base or support 12 is in accordance with the "Cutting And Scoring Die" disclosed in U.S. Pat. No. 3,863,550 of Sarka and Kang, issued Feb. 4, 1975 to ChemPar Corporation, the disclosure of which is hereby specifically incorporated herein by reference. The materials and method of construction used in making the present invention may be the same as those disclosed in U.S. Pat. No. 3,863,550.

Die 10 also includes mounting block 28 on which an embossing element 32 is mounted, preferably by means of adhesive 44. Mounting block 28 is secured in die support or base 12 by the semi-rigid plastic material 18. Anchors 30 aid in securing mounting block 28 to base 12. Mounting block 28 fits in apertures 15 and 17 in plates 14 and 16, respectively. The apertures may be formed by a photochemical etching method as described in U.S. Pat. No. 3,863,550 or may be drilled, stamped or otherwise formed in the plates. Mounting block 28 is adjusted within base or support 12 so as to be at least approximately aligned with embossing element 50 of mating die 46.

Embossing element 32 as illustrated in FIG. 2 is a female embossing element. Recesses 34 and 36 represent any suitable designs to be embossed in the sheet material. As illustrated in FIG. 1, the designs represent, for example, the numerals "1" and "4".

Embossing element 32 and mounting block 28 may be made of any suitable substantially dimensionally stable material, including, for example, copper, brass, magnesium, aluminum and, preferably, steel. Other substantially rigid and substantially dimensionally stable materials, such as some plastics, may be used to form mounting block 28 and embossing element 32. The type and thickness of the sheet material being embossed will determine the type of material used to make mounting block 28 and embossing element 32. It is presently preferred to mount embossing element 32 on mounting block 28, rather than mounting embossing element 32 directly onto plate 14, so that the proper positioning and strength can be achieved as well as reducing the chances that die base or support 12 will become warped after repeated cutting, scoring and embossing operations.

Flange 38 is integrally and frangibly attached to embossing element 32. Flange 38 contains an aperture 40 which acts as a registering means when mated with registration post 56 on mating die 46. A U-shaped channel 42 is provided between flange 38 and embossing element 32 so that flange 38 may be easily removed, such as by snapping the flange 38 from embossing element 32 along weakened channel 42. Flange 38 is removed after embossing element 32 is securely affixed to mounting block 28 following exact registration of embossing element 32 with mating embossing element 50 on mating die 46.

Mating embossing element 50 is illustrated as being a male embossing element having projections 52 and 54 adapted to mate with recesses 34 and 36 on female embossing element 32. Male embossing element 50, registration post 56 and recess 48 may be integrally formed in mating die 46 by a photochemical etching process or may be attached to mating die 46 by any other suitable method. Die 46 may be made of a high strength material such as a hard steel alloy plate. Preferably, recess 48, embossing element 50 and registration post 56 are integrally formed in die 46.

The method of registering the embossing elements and affixing embossing element 32 to mounting block 28 is as follows.

Die 10 is formed as described above with reference to U.S. Pat. No. 3,863,550. Die 46 preferably is formed by photochemically etching recess 48, embossing element 50 and registration post 56 in a steel plate.

Any suitable design is formed in embossing element 32 such that embossing element 32 mates with embossing element 50. A U-shaped channel 42 is formed between flange 38 and embossing element 32. Registration hole 40 for mating with registration post 56 is also formed in flange 38.

Embossing element 32 is placed in contact with embossing element 50 so that the embossing elements are in perfect registration. This is shown in phantom in FIG. 2. Any suitable adhesive 44 is then applied by brushing, spraying, or any other suitable means to either the upper surface of embossing element 32 or the lower exposed surface of mounting member 28. For purposes of illustration, the thickness of adhesive 44 has been greatly exaggerated. The preferred adhesive is an epoxy resin when mounting block 28 and embossing element 32 are made of steel. Any suitable adhesive or other means of attaching embossing element 32 to mounting block 28 may be used, depending upon the characteristics of mounting block 28 and embossing element 32.

Die 10 is then lowered onto die 46 in perfect registration by standard methods of aligning and registering dies. During this step, illustrated in phantom in FIG. 2, mounting block 28 is maintained in contact with adhesive 44 on embossing element 32 and the adhesive is allowed to cure. By this means, element 32 is securely attached to mounting block 28.

Die 10, now including embossing element 32 securely attached to mounting block 28, is then removed from die 46. Flange 38 is separated from embossing element 32 along the U-shaped channel 42 so that it does not interfere with the embossing operation. The cutting, scoring and embossing dies are now ready for use.

It is to be appreciated that the greatest time and labor savings will be achieved when a plurality of embossing sets are required. When small blanks are being produced, as many as fifty to one hundred or more embossing sets may be required. A plurality of embossing elements 32 may be separately produced and placed in aligned relationship with respective embossing element 50.

The registering posts and holes will ensure proper positioning and alignment of each embossing set. Adhesive may be applied so that all embossing elements 32 are secured at the same time to mounting blocks 28.

The present invention may be embodied in other specific forms without departing from the spirit or essential attributes thereof and, accordingly, reference should be made to the appended claims, rather than to the foregoing specification as indicating the scope of the invention.

I claim:

1. A cutting, scoring and embossing die set comprising:

a first die, said first die comprising a base including cutting means, scoring means and first embossing means, a mating die comprising a base including means for cooperating with said cutting means and said scoring means, and mating embossing means for cooperating with said first embossing means, registering means on said first embossing means having aperture means therethrough for receiving post means, post means on said mating die for cooperating with said aperture means to enable proper registration of said first embossing means and said mating embossing means, and means adapted to facilitate frangible removal of said registering means from said first embossing means along a predetermined portion.

2. A die set according to claim 1 wherein said registering means is an integral horizontal flange extending from said embossing means having a weakened portion for frangible removal therefrom.

3. A die set according to claim 1 wherein said embossing means comprises a substantially rigid female member attached to said first die and said mating embossing means comprises a substantially rigid male member integrally forming a part of the mating surface of said mating die.

4. A die set according to claim 1 wherein said first embossing means comprises a substantially rigid male member attached to said first die and said mating embossing means comprises a substantially rigid female member integrally forming a part of the mating surface of said mating die.

5. A die set according to claim 1 wherein said first embossing means is adhesively attached to a mounting block substantially rigidly mounted in said first die.

* * * * *